Jan. 19, 1954 G. R. PURIFOY 2,666,877

DYNAMIC-BRAKING PROTECTION

Filed Feb. 13, 1952 2 Sheets-Sheet 1

INVENTOR
George R. Purifoy.
BY O.B. Buchanan
ATTORNEY

Jan. 19, 1954

G. R. PURIFOY 2,666,877

DYNAMIC-BRAKING PROTECTION

Filed Feb. 13, 1952

2 Sheets-Sheet 2

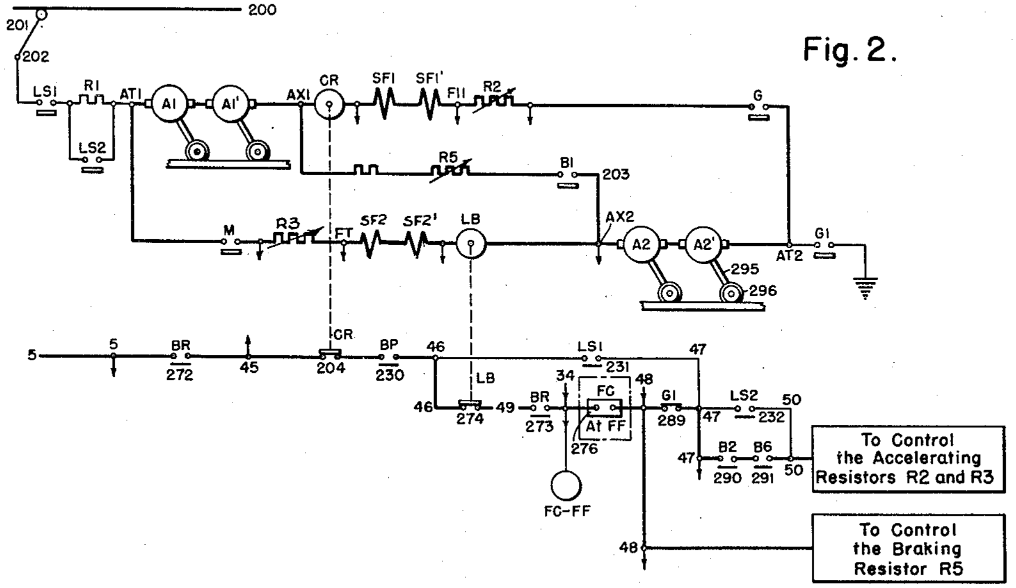

Fig. 2.

Fig. 3.

| Operation | Motor Connections | | Brake | MC | Sequence Step | Ser.-Par. Pwr.-Switches | | | | | | Accel. Resistor | | | Field-Shunt FC Contacts | | | | | Braking Resistor | | | |
|---|---|---|---|---|---|---|---|---|---|---|---|---|---|---|---|---|---|---|---|---|---|---|---|
| | | | | | | LS1 | G1 | LS2 | JR | J | M G | 1-2 | 3-4 | 9-10 | 11 12 | 13 14 | 15 16 | 17 18 | 19 20 | B1 | B2 | B5 | B6 |
| Power | Series | Full Field | Off | 1 | 1 | O | O | | O | | | | | | | | | | | | | | |
| | | | | 2 | 2 | O | O | O | O | | | | | | | | | | | | | | |
| | | | | 3 | 3 | O | O | O | O | | | O | | | | | | | | | | | |
| | | | | | 4 | O | O | O | O | | | O | O | | | | | | | | | | |
| | | | | | 5 | O | O | O | O | | | O | | O | | | | | | | | | |
| | | | | | 6 | O | O | O | | O | | O | | | | | | | | | | | |
| | Parallel | | | | T | O | O | O | | O | O | O | | | | | | | | | | | |
| | | | | | 7 | O | O | O | | | O | O | | | | | | | | | | | |
| | | | | | 8 | O | O | O | | | O | O | O | | | | | | | | | | |
| | | | | | 9 | O | O | O | | | O | O | | O | | | | | | | | | |
| | | Shunted Field | | | 10 | | | | | | O | O | | O | O | | | | | | | | |
| | | | | | 11 | | | | | | O | O | | O | O | O | | | | | | | |
| | | | | | 12 | | | | | | O | O | | O | O | O | O | | | | | | |
| | | | | | 13 | | | | | | O | O | | O | O | O | O | O | | | | | |
| | | | | | 14 | | | | | | O | O | | O | O | O | O | O | O | | | | |
| Spotting And Braking | | | Off or On | Off | 1 | | | | | | O | | | | O | O | O | O | O | O | | | |
| | | | | | 2 | | | | | | O | | | | O | O | O | O | | O | | | |
| | | | | | 3 | | | | | | O | | | | O | O | O | | | O | | | |
| | | | | | 4 | | | | | | O | | | | O | O | | | | O | | | |
| | | | | | 5 | | | | | | O | | | | O | | | | | O | | | |
| | | Full Field | | | 6 | | | | | | O | | | | | | | | | O | | | |
| | | | | | 7 | | | | | | O | | | | | | | | | O | O | | |
| | | | | | 8 | | | | | | O | | | | | | | | | | | O | |
| | | | | | 9 | | | | | | O | | | | | | | | | | | O | O |
| | | | | | 10 | | | | | | O | | | | | | | | | | O | O | O |
| | | | | | 11 | | | | | | O | O | | | | | | | | | O | O | O |
| | | | | | 12 | | | | | | O | O | O | | | | | | | | O | O | O |
| | | | | | 13 | | | | | | O | O | | O | | | | | | | O | O | O |

INVENTOR
George R. Purifoy.
BY O. B. Buchanan
ATTORNEY

Patented Jan. 19, 1954 2,666,877

UNITED STATES PATENT OFFICE 2,666,877

DYNAMIC-BRAKING PROTECTION

George R. Purifoy, Pittsburgh, Pa., assignor to Westinghouse Electric Corporation, East Pittsburgh, Pa., a corporation of Pennsylvania Application February 13, 1952, Serial No. 271,343

4 Claims. (Cl. 318—52)

My invention relates to direct-current electrically propelled railway-vehicles, and it has particular relation to electrical control-systems therefor, in which provision is made for dynamic braking. My invention is an improvement over the type of control which is shown in the Riley and Purifoy Patent 2,523,143, granted September 19, 1950; an application of Lynn G. Riley, Serial No. 95,904, filed May 28, 1949; and an application of John E. Drake, Serial No. 258,712, filed November 28, 1951.

My present invention relates to a system of control, for protecting the traction-motor or motors, during dynamic-braking operation, in the event of the slipping of one or more of the wheels. In the railway-motor control-system to which my invention relates, it has been usual to provide four traction-motors per car, each motor driving its own drive-axle and drive-wheels. Two of these motors have been permanently connected in series with each other, to provide one series-motor means, while the other two motors have been permanently connected in series with each other to provide a second series-motor means. The dynamic-braking connections have been such that two dynamic-braking circuits have been provided, with the two armatures of one of the two series-motor means loaded by the field-windings of the other one of said two series-motor means. During dynamic braking, the resistance in the two dynamic-braking circuits has been progressively reduced, under a single limit-relay control, which permitted the braking-progression to occur, or to continue, whenever, or as long as, the braking-controlling limit-relay registered a current which was lower than the desired minimum braking-current.

Heretofore, this common braking-controlling limit-relay means has been a recalibrated adjustment of the accelerating-controlling limit-relay means. It has been responsive to the armature current in one of the two series-motor means or circuits.

My tests have indicated that if the wheels which drive one of these traction motors, as a series generator, should slip, during dynamic braking, the current in the motor-armatures of that series-motor means, or that pair of series generators, will decrease, while the current in the other two motor-armatures will increase. This is because the speed of the slipping motor drops practically to zero, and hence it generates no voltage as a series generator.

Under the old scheme, wherein only one braking-controlling limit-relay is used, if the operating-coil of this limit-relay should happen to be in the armature-circuit of a pair of motors, or a series-motor means, containing a slipping motor, this limit-relay would automatically cause a progressive decrease in the braking-circuit resistance in both of the dynamic-braking circuits, in an attempt to bring up the braking-current in the faulty dynamic-braking circuit to a predetermined minimum braking-current value. This would apply full braking-current excitation to the series field windings of the armatures which are in the other dynamic-braking circuit, and hence the effect of progressively reducing the dynamic-braking resistance in this other or sound dynamic-braking circuit results in very excessive armature-currents in this sound circuit. Tests have shown that these excessive currents may be many times the normal braking-current value, even at moderate motor-speeds. These excessive currents result in excessive braking and excessive motor-heating, or even burnouts, and produce a strong possibility of motor-flashing.

In accordance with my present invention, I overcome these difficulties, and I even stop such slipping, without requiring any special relays, or any extra train-line wires for controlling a multiple-unit train embodying my equipment. I accomplish this by the simple expedient of providing a second braking-controlling limit-relay, having its operating-coil connected in series with the motor-armatures which heretofore have not been provided with a braking-controlling limit-relay means, and I allow a progressive reduction of the resistance in both of the braking-circuits to occur, or to continue, only when both of the braking-current limit-relays register a current which is lower than the desired minimum value of braking-current. If, as is usual, the limit-relay calibration is adjusted in accordance with the position of the brake-handle (so as to obtain various selected braking-rates), then preferably the same recalibrating-means should be applied to both of the braking-controlling limit-relays.

My tests have indicated that if a drive-wheel axle begins to slip, during dynamic braking, not only does the current of that motor-armature drop immediately, but the armature-voltage of the two aramtures in the sound dynamic-braking circuit begins to fall off, changing somewhat slowly because of the slow flux-changes which occur in a self-excited series-generator combination. Consequently, the excitation of the series field winding of the slipping motor falls off, thus reducing the load on this motor which is operating as a generator. While this operation has been described as "slow," it will usually be found, in a matter of perhaps a second, or a very few seconds, which is really a small time in the braking cycle, that the load on the slipping armature will be reduced sufficiently so that it stops slipping, and begins operating normally again as a driven series generator, whereupon the braking-progression automatically picks up where it left off, and proceeds in a normal manner. Meanwhile, some dynamic braking has been continuously available, on the car or train, and the delay in picking up full dynamic braking-conditions has been only a small part of the time which is required to stop the car or train. At the same time, the motors which are connected to the non-slipping wheels are protected against excessive currents and against commutator-flashing, while the occupants of the car or train are protected against excessive braking-efforts such as were heretofore experienced.

With the foregoing and other objects in view, my invention consists in the circuits, systems, apparatus, combinations, parts, and methods of design and operation, hereinafter described and claimed, and illustrated in the accompanying drawing, wherein:

Fig. 2 is a fragmentary schematic, or across-the-line diagram, of the novel features of my present invention, and enough of the other equipment to show the setting of the invention and the operation of its essential or generic features; and Fig. 3 is a sequence-chart.

Figure 1:
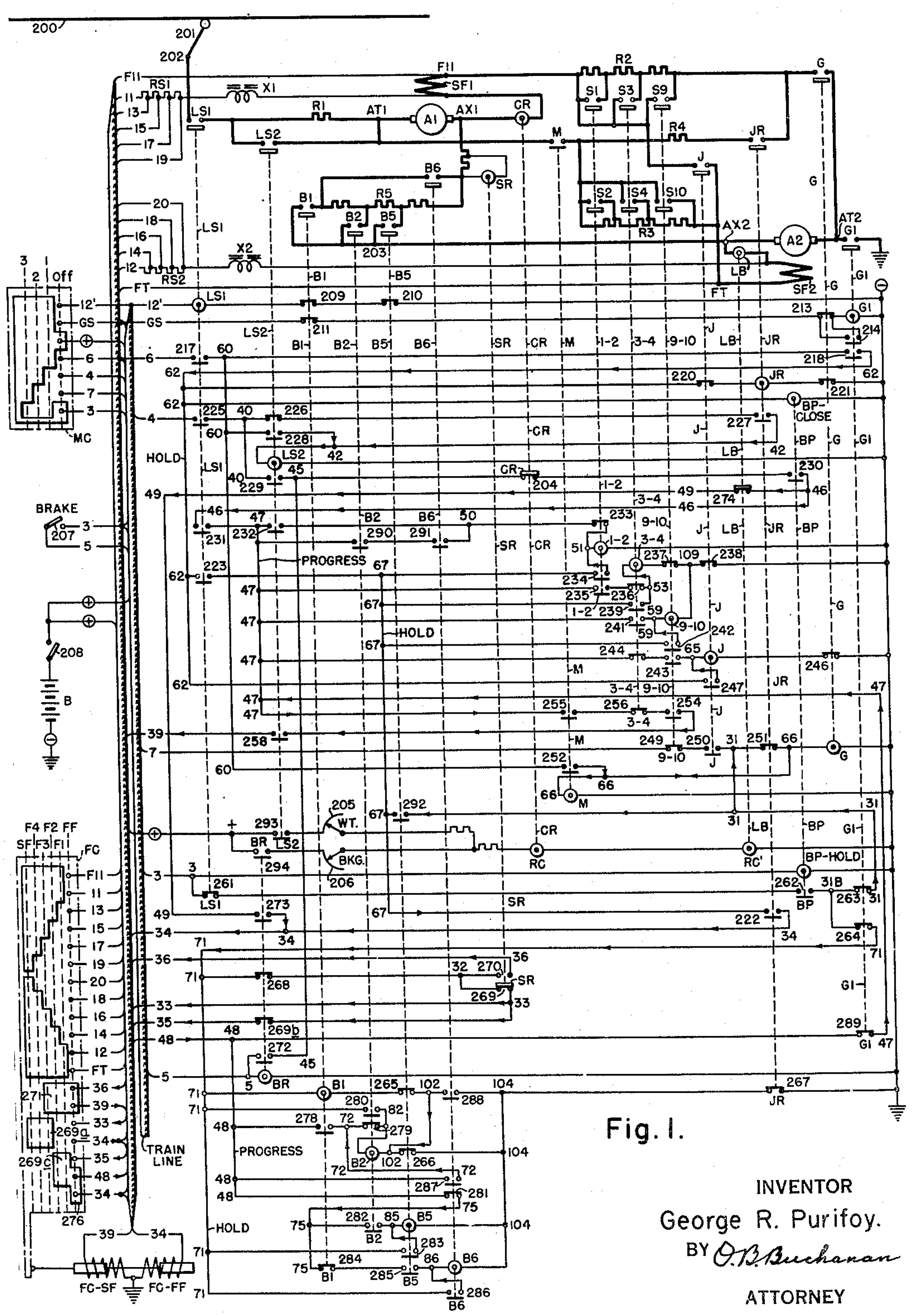
Figure 1 is a simplified circuit-diagram of the parts of one car, which are necessary to illustrate my present invention, omitting many parts which are known to be needed in a successful railway-control equipment of the type to which my invention is applied, but which are not necessary to be discussed in setting forth the nature and operation of my present improvements.

Fig. 1 represents some of the equipment which is carried by a single electrically propelled railway-car embodying my invention. Direct-current power is supplied to the car from a trolley-wire 200, or a third rail, which is engaged by a trolley-pole 201, or a third-rail shoe or other current-collecting equipment, carried by the car. The trolley-pole 201 energizes a line 202 which constitutes a supply-circuit for the car. The traction-motors for the car are series motors, which are indicated, by way of a simple example, in Fig. 1, as comprising two motor-armatures A1 and A2, each being associated with its own series field winding SF1 and SF2, respectively, the ordinary reversing-switches being omitted for the sake of simplicity. Two series-motor means, or circuits, are shown. The first series-motor means comprises, in series, an armature-terminal AT1, a motor-armature or armatures A1, an intermediate connection-point AX1, a series field winding or windings SF1, for supplying the field-excitation for said armature or armatures, and a field-terminal F11. The corresponding parts for the second series-motor means are indicated at AT2, A2, AX2, SF2, and FT.

A series-parallel motor-control arrangement is shown in Fig. 1, in which a line-switch or relay LS1 and a ground-switch G1 are used as power-switch means for establishing a power circuit for energizing the motors, by connecting the first armature-terminal AT1 to the supply-circuit 202, and connecting the second armature-terminal AT2 to ground. For completing the series-circuit connections, a switch JR is closed in addition to the power-switches LS1 and G1. For parallel-motor operation, two switches M and G are closed in addition to the power-switches LS1 and G1. The parallel-motor switch M provides a circuit-connection between the armature-terminal AT1 of one series-motor means and the field-terminal FT of the other series-motor means; while the other parallel-motor switch G provides a circuit-connection between the other armature-terminal AT2 and the other field-terminal F11. During an intermediate transition-period, a switch J is closed. These motor-controlling connections are all in accordance with a well-known switching-system.

Dynamic-braking circuits are established by opening the two power-switches LS1 and G1 and closing a braking-switch B1 in addition to the two parallel-connection switches M and G, also in accordance with a well-known system or arrangement. The braking-switch B1 provides a common dynamic-braking circuit-connection 203 between the respective intermediate connection-points AX1 and AX2 of the two series-motor means, thus providing two dynamic-braking circuits wherein the motor-armature or armatures of each of said series-motor means are loaded by the field winding or windings of the other one of said series-motor means, respectively.

A suitable number of series-connected accelerating resistances are used, as indicated at R1, R2, R3 and R4. The resistance R1 is disposed between the supply-line 202 and the first armature-terminal AT1, and is shorted out by means of a second line-switch LS2. The resistance R2 is in series with the first field-terminal F11, and is progressively shorted out by means of switch-contacts S1, S3 and S9. The resistance R3 is in series with the second field-terminal FT, and is progressively shorted out by switch-contacts S2, S4 and S10. The resistance R4 is in the series-motor connection which is made by the switch JR, and this resistance is finally shorted out by the transition-switch J, for obtaining the full-series power-circuit connection of the motors. During parallel motor operation, the switch-contacts S3, S4 and S9, S10 are successively or progressively closed, during the acceleration of the motor, and after all of the accelerating-resistances R2 and R3 have been cut out, the field-strengths of the motors are progressively reduced, to provide short-field operating-conditions.

In accordance with a usual arrangement, the motor-fields are reduced by equipping each of the series field windings SF1 and SF2 with a field-shunt, comprising an inductive reactor X1 or X2, as the case may be, and a variable resistor RS1 and RS2, respectively. The field-shunts X1-RS1 and X2-RS2 are first connected in parallel relation to their respective field-windings SF1 and SF2, by means of contact-terminals 11 and 12 respectively of a progressively or sequentially operating field-controlling means, which is herein illustrated as an electrically operated drum-type field-controller FC. After the respective field-shunts have been connected into operation, the field-shunt resistances RS1 and RS2 are then progressively shorted out by successive controller-points 13, 15, 17 and 19, for RS1, and 14, 16, 18 and 20, for RS2, as the field-controller FC is moved from its initial full-field position FF, through its intermediate positions F1, F2, F3 and F4 to its short-field position SF, at which point the field-winding currents are reduced to about fifty per cent of their unshunted values.

During dynamic braking, the two motors are connected by the common dynamic-braking circuit-connection 203, which contains the braking-switch B1 and a braking-resistance R5. This resistance R5 is used, in addition to the previously mentioned accelerating-resistances R2 and R3, in establishing the complete dynamic-braking circuit. The braking-resistance R5 is progressively shorted out by means of braking-switches B2, B5 and B6, during dynamic-braking operations, after which the acceleration-resistances R2 and R3, or portions thereof, are progressively shorted out, as by the switch-contacts S3, S4, and S9, S10. (The switch contacts S1 and S2 are permanently closed during the dynamic-braking operations, in the illustrated system.)

The progressive operation of the various resistance-shorting switches, during both motoring operation and dynamic braking, is under the automatic control of a suitable limit-relay or relays, which are energized to be responsive to conditions which accompany excessive torque in the motors. Such a limit-relay is illustrated in the form of a current-relay CR, having an actuating-coil CR which is connected in series-circuit relation between the intermediate connection-point AX1 and the series field winding SF1. This current-relay CR also has a back-contact 204 (also marked CR), which is normally closed, that is, which is closed in the non-actuated or low-current position of the relay.

The current-relay CR is also provided with certain recalibrating-means. In accordance with previous practice, this relay is provided with a cumulatively operating rate-coil RC, which is energized through a weight-responsive rheostat 205, during accelerating operations, and which is energized through a braking-responsive rheostat 206 during dynamic-braking conditions. The weight-responsive rheostat 205 is automatically adjusted according to the variable weight or live load carried by the car, so that the rate-coil RC is the most strongly excited during light-load conditions, thus reducing the minimum-current setting at which the limit-relay CR picks up and opens its back-contact 204. The braking-responsive rheostat 206 is automatically changed in response to the position of the brake-handle 207, so that the rate-coil RC has its maximum excitation when a low braking-rate is called for, thus providing a low minimum-current setting at which the limit-relay CR picks up and opens its back contact 204.

All of the electrically controlled relays and switches which are shown in Fig. 1 are diagrammatically indicated as having vertical switch-stems (indicated by dotted lines), which are biased by gravity toward their lowermost positions, and all of these switches and relays are shown, in Fig. 1, in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The various electrical control-circuits for the train are under the control of a number of train-line wires, which extend from car to car, throughout the entire length of the train. In the simplified circuit-diagram of Fig. 1, eight of these train-line wires are indicated, being given their usual designations, namely (+), 3, 4, 5, 6, 7, 12' and GS.

Energy for the various relay-circuits is provided by means of a battery B on each car. The negative terminal (−) of each battery is permanently grounded, while the positive terminal of each battery is connected, through a switch 208, to the positive train-line wire (+).

Each end of each car is provided with a motorman's master controller MC, only one of which is indicated in Fig. 1. The illustrated master controller MC is indicated as being an accelerating-controller having an off-position and three on-positions 1, 2 and 3. In each of the three on-positions of the master-controller MC, the positive control-wire (+) is connected to the train-line wires 12', GS and 6. The train-line wire 12' is the energizing-wire for the operating-coil LS1 of the line-switch LS1; while the train-line wire GS is the energizing-wire for the operating-coil G1 of the ground-switch G1, as will be subsequently described.

In the second and third on-positions of the accelerating-drum of the master controller MC, the train-line wire 4 is energized from the positive bus (+); while in the third on-position of this controller, the train-line wire 7 is energized from the positive bus (+).

In the off-position of the accelerating drum or master controller MC, a connection is made from the positive control-wire (+) to the train-line wire 3. In the master controller MC, in accordance with a known practice, there is an overlap between the off-position contact which energizes this conductor 3, and the on-position contacts which energize the conductors 12' and GS, so that, during the notching-off of the master-controller MC, the contact at 3 is made before the contact or contacts at 12' and GS are broken. This overlapping construction is particularly necessary in properly controlling a braking-operation protective-relay BP which will be subsequently described, and which also constitutes the subject matter of the previously mentioned Riley application.

The circuits and the operations, under the control of the various control-wires 12', GS, 6, 4, 7, 3 and 5, are best described together, with special emphasis on the novel features of my present invention. Reference may be made to the previously mentioned copending Riley application, and also to the previously mentioned Riley and Purifoy Patent 2,523,143, granted September 19, 1950, for further explanations of previously known features with which my present invention cooperates. Reference may also be had to Fig. 3 of the accompanying drawings, which shows the sequence of the switching operations.

The first on-position of the accelerating-controller MC, in Fig. 1, is a switching position, in which the control-wires 12', GS, and 6 are all energized. The control-wire 12' energizes the operating-coil LS1 of the line-switch LS1, through interlocks which are provided by the braking-switches B1 and B5, in the form of back-contacts 209 and 210, respectively.

The train-line wire GS energizes the operating-coil G1 of the ground-switch G1, through interlocks which are provided, by the braking-switch B1 and the parallel-operation switch G, in the form of back-contacts 211 and 213, respectively; and this ground-switch G1 is provided with a make-contact 214 which by-passes the G-interlock 213.

The train-line wire 6 is connected, through an LS1 make-contact 217, to a relay-circuit 60, which is connected, through a G1 make-contact 218, to a circuit 62 which constitutes a hold-circuit for the switch-progression for the accelerating-resistance short-circuiting switches S1 to S10 and J. This hold-circuit 62 is used to energize the operating coil JR of the series-motor-circuit switch JR, through interlocks on the switches J and G, in the form of back-contacts 220, and 221, respectively. The said hold-circuit 62 is also used to directly energize the close-coil or actuating-coil BP-Close of the braking-operation protective-relay BP.

The result of the master-control energizations, in the No. 1 on-position of the master-controller MC, is thus to close the main-circuit or power-circuit contacts of the traction-motor switches LS1, G1 and JR, thereby completing a series-connection motor-circuit for causing a slow movement of the train, for so-called "switching" purposes, with all of the accelerating-resistances in series with the motors. This circuit can be traced from the supply-circuit 202, through the main LS1 contact, the resistor R1, the armature A1, the current-relay coil CR, the series field SF1, the resistance R2, the main JR contact, the resistance R4, the resistance R3, the series field SF2, the motor armature A2, and the main G1 contact, to ground.

At the same time, the energization of the braking-operation protective-relay BP paves the way for the subsequent energization of the dynamic-braking circuits of the motors, and also for the automatic progression-control, under the control of the limit-relay or current-relay CR, both for the motoring progression during acceleration, and for the dynamic-braking progression during an application of the brake-lever 207, as will be subsequently described.

The energization of the series-connection switch JR closes a JR make-contact 222 which energizes the full-field wire 34 of the field-controller FC, from a hold-circuit 67, which is connected to the previously described hold-circuit 62 through an LS1 make-contact 223.

The full-field wire 34 of the field-controller FC energizes a full-field coil FC—FF, or other means for causing the field controller FC to move or progress from its short-field position SF to its full-field position FF. This energization of the full-field coil FC—FF in response to an actuation of the series-connection switch JR thus assures that the field-controller FC is in its full-field position FF during the series-connection operation of the traction-motors.

The No. 2 position of the accelerating-controller MC energizes the train-line wire 4, which is connected, through an LS1 make-contact 225, to a conductor 40. The conductor 40 is connected, through an LS2 back-contact 226, and a JR make-contact 227, to a conductor 42, which energizes the operating-coil LS2 of the second line-switch LS2, which short-circuits the first accelerating-resistor R1. This LS2 switch has a make-contact 228 which picks up and serves as a holding-circuit contact between the circuits 60 and 42.

This second line-switch LS2 also has a make-contact 229 which connects the circuit 40 to a circuit 45, which is connected, through the CR limit-relay back-contact 204, and a BP make-contact 230, to a circuit 46 which constitutes the main limit-relay progression-circuit of the control-equipment. This limit-relay progression-circuit 46 is thus not only under the control of the limit-relay or current-relay CR, which is responsive to excessive motor-currents, but it is also under the control of the braking-operation protective-relay BP, which must be closed (with the protective relay in its actuated position) before there can be any progression during either the motoring operation or the braking operation.

This limit-relay progression-circuit 46 is connected, through an LS1 make-contact 231, to a progression-wire 47, which is connected through an LS2 make-contact 232 to a control-wire 50. The control-wire 50 energizes the operating-coil 1—2 for a resistor-shorting progression-switch which carries the two main contacts S1 and S2, this energization being effected through a back-contact 233 of this same switch 1—2. Thus, this energizing-circuit from the conductor 50 includes the switch-out interlock 233, a conductor 51, and the coil 1—2. The switch 1—2 picks up and closes a holding-circuit make-contact 234, which energizes the circuit 51 from the hold-circuit 67.

The actuation of the resistance-shorting switch 1—2 also closes a make-contact 235, which energizes a circuit 53 from the progression-circuit 47, through a back-contact 236 of a resistance-shorting switch 3—4, which is the switch which carries the main switching-contacts S3 and S4. The energizing circuit for this switch extends from the conductor 53, through the operating coil 3—4 and a back-contact 237 of a resistance-shorting switch 9—10, thence through a control-circuit conductor 109, and a J-switch back-contact 238, to the grounded negative battery-terminal (—). The actuation of the resistance-shorting switch 3—4 closes a make-contact 239 which establishes a holding-circuit for the conductor 53 from the hold-wire 67.

The actuation of the progression-switch 3—4 also closes a make-contact 241, which completes a circuit from the progression-wire 47 to a conductor 59, which energizes the actuating coil 9—10 of the resistance-shorting switch which carries the main switch-contacts S9 and S10, the negative terminal of said coil 9—10 being connected to the previously described wire 109. The actuation of the switch 9—10 closes a make-contact 242 which establishes a holding-circuit for the conductor 59 from the hold-wire 67.

The actuation of the resistance-shorting switch 9—10 also closes a make-contact 243, which is connected between the progression-wire 47, a back-contact 244 of the resistance-shorting switch 3—4, and a circuit 65, thus energizing the operating-coil J of the transition-switch J, through the G-switch back-contact 246. The transition-switch J then closes its main or power-circuit contact J, which constitutes the last step in the series motor-connection for the traction-motors, cutting out the last accelerating-resistance R4. This transition-switch J has a make-contact 247 which establishes a holding-circuit from the conductor 65 back to the hold-line 62. The previously described J-switch back-contacts 220 and 238 are opened, upon the energization of the transition-switch J, thus dropping out the initial series-connection switch JR, and the accelerating-switches 3—4 and 9—10.

The next step in the acceleration of the traction-motors is accomplished by a movement of the master-controller MC to its No. 3 position, which energizes the train-line wire 7. This train-wire 7 is connected, through a back-contact 249 of the resistance-shorting switch 9—10, and a make-contact 250 of the transition-switch J, so as to energize a control circuit 31, which is in turn connected, through a JR back-contact 251, to a control-circuit 66 which energizes the operating coils M and G of the parallel-motor-connection switches M and G. These switches M and G thereupon connect the traction-motors in parallel, between the supply-circuit 202 and ground, with only two of the resistance-shorting switches energized, namely the second line-switch LS2, and the switch 1—2 which carries the main switching-contacts S1 and S2. The energization of the parallel-connection switch G opens the previously described back-contact 246, which drops out the transition-switch J. The energization of the parallel-connection switch M closes a make-contact 252, which establishes a holding-circuit for the conductor 66 from the line 60.

Responsive to the dropping-out of the transition-switch J, the back-contact 238 of this switch recloses, and re-initiates the switch-progression of the resistance-shorting contacts S3 to S10, under the control of the switches 3—4 and 9—10, through the circuits which have been previously described. This establishes the maximum armature-voltage conditions on the motors, and it completes the connections for the full-field parallel-connection operation of the traction-motors, as indicated also in the sequence-chart of Fig. 3.

As soon as the last resistance-shorting switch 9—10 closes, it closes an additional contact 254, which energizes a field-controller-actuating circuit from the progress-wire 47, said circuit extending from the wire 47 through a make-contact 255 of the parallel-connection switch M, a back-contact 256 of the resistance-shorting switch 3—4, the aforesaid make-contact 254 of the resistance-shorting switch 9—10, and a make-contact 258 of the line-switch LS2, and thence to the short-field wire 39 of the field-controller FC.

The short-field wire 39 of the field-controller FC energizes the short-field coil FC—SF, or other means which may be used to move the field-controller from its full-field position FF to its short-field position SF. This starts the progressive operation of the field-controller, and it may be brought about in any one of several ways. In the illustrated form of embodiment, since the control-power for the short-field wire 39 is obtained from the progress-wire 47, which is under the control of the CR limit-relay contact 204, the field-weakening progression of the field-controller FC is interrupted whenever the motor-current is above its predetermined minimum value, for which the limit-relay CR is set. This completes the connections for the short-field parallel-connection operation of the traction-motors, thus completing the acceleration-progression, as indicated in the sequence-chart of Fig. 3.

If, now, the master-controller MC is returned to its off-position, the car or train being now running at some speed, the master-controller will energize the train-line wire 3, which may be described as the brake-wire 3, because it is used to set up the dynamic-braking circuits for the motors during the coasting operation. When the braking-protective relay BP is used, as shown, the brake-wire 3 is also used to directly energize the hold-coil BP-Hold of the braking-protective relay BP, and this hold-coil may be regarded as representative of any holding-means which is effective only after the protective relay BP has previously been moved to its actuated position. When a separate holding-coil BP-Hold is used as such a holding-means for the BP relay, said coil will be made so as to be too weak to pick up the BP relay if the relay is in its non-actuated position when the hold-coil is energized, but the hold-coil BP-Hold has enough energy to hold the relay actuated or closed, once it has been actuated.

The brake-wire 3 is connected, through an LS1 back-contact 261 and a BP make-contact 262, to a control-circuit 31B. This control-circuit 31B is connected, through a G1 back-contact 263, to the previously described control-circuit wire 31, which energizes the previously described parallel-motoring switches M and G through the JR back-contact 251 and the control-wire 66. The control-conductor 31B is also connected, through a G1 back-contact 264, to a braking-operation hold-wire 71, which is connected to the positive terminal of the braking-switch coil B1, the negative terminal of which is connected in a circuit which includes a B5 back-contact 265, a conductor 102, another B5 back-contact 266, a conductor 104, and a JR back-contact 267, and thence to the grounded negative battery-terminal (—). The closure of the switches M, G and B1 completes the establishment of a weak coasting-operation dynamic-braking circuit-connection for the traction-motors, with all of the available dynamic-braking resistances R5, R2 and R3 in circuit, this dynamic-braking resistance being large enough so that the braking tractive-effort is usually quite weak, at moderate motor-speeds, thus permitting the train to coast, with little or no sensible or perceptible braking-effect, as long as the field-controller FC remains in its short-field position.

A connection is also provided, for controlling the field-controller FC during the coasting-operation. Thus, I provide a circuit extending from the braking-operation hold-wire 71, through a back-contact 268 of a brake-relay BR, to a control-circuit 32, and thence, through the back-contact 269 of a spotting-relay SR, to a spotting-operation control-circuit 33. The brake-relay BR was shown and described in the previously mentioned Riley and Purifoy patent, and its energizing-circuit will be referred to hereinafter. The spotting relay SR is a previously used relay, having an operating-coil SR which is included in the common brake-circuit connection 203, so that this relay is responsive to the braking-circuit current. This spotting-relay SR is adjusted to have a low-current pickup-value, so that it can hold the braking-circuit current to a small value suitable for spotting purposes, during the coasting operation of the traction-motors, as is well understood in the art.

The spotting-operation control-circuit 33 is used to control two branch-circuits in a known manner. The first branch-circuit from the wire 33 extends to a field-controller segment 269*a*, this segment making a closed contact when the field-controller FC is in positions SF through F3. This field-controller segment 269*a* connects the control-circuit 33 to the full-field wire 34 of the field-controller FC. The second branch-circuit from the spotting-operation control-wire 33 is through a back-contact 269*b* of the brake-relay BR, and thence to a conductor 35, a field-controller contact-segment 269c, and then to a braking-progression circuit 48, the function of which will be subsequently described.

In accordance with a known control-method, the spotting-relay SR has a make-contact 270 which connects the circuit 32 to a circuit 36, which goes to a field-controller contact-segment 271, which is closed only during certain early points in the progressive movement of a field-controller FC from its full-field position FF toward its short-field position SF. This field-controller segment 271 is preferably opened at a certain point near the short-field position SF, preferably before the field-controller reaches this short-field position SF. As shown, I prefer to have this field-controller segment 271 closed at the positions FF through F3 of the field-controller FC. This field-controller segment 271 is used to connect the wire 36 to the short-field wire 39 of the field-controller FC. In this way, when the spotting current is too large, that is, large enough to pick up the spotting-relay SR, the spotting current is reduced by adjusting the motor-fields toward a weaker condition, by making the field-controller FC progress in the direction towards its short-field position, but this progression is usually arrested before the field-controller returns all of the way back to its original short-field position SF, which it occupied before the spotting-control commenced to operate.

A service braking-application is made by the closure of the brake-lever 207, which energizes the full-brake wire 5 from the brake-wire 3. This full-brake wire 5 is connected directly to the coil BR of the brake-relay BR. This brake-relay BR has a make-contact 272, which connects the full-brake line 5 to the conductor 45 which leads up to the limit-relay progression-circuit 46, thus putting the braking progression under the control of the back-contact 204 of the limit-relay or current-relay CR, as well as under the control of the BP make-contact 230, both of which are in circuit between the conductor 45 and the limit-relay progression-circuit 46.

Whenever a braking-application is called for, the energization of the brake-relay BR closes a BR make-contact 273, which is used to energize the full-field wire 34, in the initiation of the dynamic-braking progression, as will shortly be described. In accordance with my present invention, however, I also use a second braking-controlling limit-relay, the operating coil of which is shown at LB, in the circuit between the intermediate connection-point AX2 of the second series-motor means, and the series field winding SF2 of said second series-motor means. This second limit-relay LB is provided with a back-contact 274, which is connected between the limit-relay progression-circuit 46 and a control-wire 49, which is in turn connected to the brake-relay make-contact 273, and thence to the full-field wire 34 of the field-controller FC. Since the first limit-relay progression-circuit 46 is under the control of the first limit-relay CR, and since the control-wire 49 is additionally under the control of the second limit-relay LB, the dynamic-braking progression is thus under the control of both of these limit-relays CR and LB, in accordance with my present invention.

When the braking-controlling progression has proceeded to the point at which full-field conditions are restored in the traction-motors, the field-controller FC closes a full-field contact-member 276, which closes a circuit from the full-field wire 34 to the braking-progression circuit 48.

The energization of the braking-circuit progression-wire 48 immediately serves, through a B1 make-contact 278, which is already closed, to energize a circuit 72, which is connected, through a B2 back-contact 279, to a circuit 82 which is connected to the positive terminal of the B2 actuating-coil, the negative terminal of which is connected to the previously described conductor 102. The B2 switch thus picks up and closes its main contact B2 which shorts out a part of the braking-resistance R5 in the common dynamic-braking circuit 203 of the traction-motors. The actuation of the B2 switch closes a make-contact 280 which establishes a holding-circuit for the wire 82 from the hold-wire 71.

A circuit is next established from the lower end of the progression-wire 48, through a B6 back-contact 281, to a conductor 75, and thence through a B2 make-contact 282, which has just been closed, to a conductor 85 which is connected to the positive terminal of the B5 actuating-coil, the negative terminal of which is connected to the previously mentioned wire 104. The B5 switch closes its main-circuit contact B5, which shorts out more of the braking-resistance R5 in the common dynamic-braking circuit 203 of the traction-motors. At the same time, the B5 switch closes a make-contact 283 which establishes a holding-circuit from the conductor 85 back to the hold-wire 71.

The energization of the braking-progression switch B5 opens its previously mentioned back-contacts 265 and 266, thus dropping out the switches B1 and B2, the main contacts of which are both short-circuited, now, by the main contact B5. The dropping-out of the B1 switch closes its lowermost back-contact 284, which completes a circuit from the conductor 75 to a B5 make-contact 285, and thence to a wire 86, which is connected to the positive terminal of the B6 coil, the negative terminal of which is connected to the wire 104. The B6 switch thus closes, and closes its main contact B6 which further shorts out some of the braking-resistor R5, thus still further reducing the effective braking-resistance in the dynamic-braking circuits. At the same time, the actuation of the B6 switch closes its make-contact 286, which establishes a holding-circuit for the wire 86 from the wire 71.

The actuation of the B6 switch also closes a make-contact 287, which connects the progression-wire 48 to the previously described conductor 72, thereby reenergizing the B2 switch, the negative circuit of which is now completed from the wire 102, through a B6 make-contact 288, to the wire 104.

It will be understood that all of these braking-progression operations are under the control of both of the limit-relays CR and LB, so that when either one of these limit-relays responds and picks up its back-contact 204 or 274, as the case may be, the braking-progression will be interrupted until the motor-current subsides to a desirable value.

The braking-circuit progression-wire 48 is also connected, through a G1 out-contact or back-contact 289, to the accelerating-resistance progression-wire 47.

After the second closure or actuation of the B2 switch, so that the B2 and B6 switches are now both closed, a circuit is made, from the accelerating - resistance progression - wire 47, through a B2 make-contact 290 and a B6 make-contact 291, to the previously described conductor 50, thus re-initiating the progression of the switches 1—2, 3—4, and 9—10, which progressively cut out the accelerating resistors R2 and R3 which are in the individual portions of the respective dynamic-braking circuits of the traction-motors, this progression being also under the same limit-relay control.

Ever since the actuation of the B5 switch, a B5 make-contact 292 has been energizing the accelerating-resistance hold-circuit 67 from the wire 31, in readiness for this progression of the accelerating-resistor switches S1 to S10. The braking-progression thus continues until substantially all of the braking-resistance is removed from the dynamic-braking circuit, thus resulting in the completion of the dynamic-braking operation, during which the speed of the car or train has been reduced from the initial speed at which the dynamic brake was applied, down to a low speed at which the dynamic brake fades out.

It has long been customary to automatically recalibrate the limit-relay CR, by means of the rate-coil RC, which adjusts the dropout-setting of this limit-relay in accordance with desired operating-conditions during both motoring and braking. These rate-coil adjustments involve both the previously mentioned weight-responsive rheostat 205, which is in circuit with a make-contact 293 of the line-switch LS2, which is closed during acceleration-progression; and the previously mentioned braking-responsive rheostat 206, which is in circuit with a make-contact 294 of the braking-relay BR, which is closed when dynamic braking is called for by the energization of the full-brake line 5.

In my invention, if such a rate-coil RC is used, for a limit-relay CR which is used during both acceleration and braking, then it is desirable, as shown in Fig. 1, that a similar rate-coil RC' shall be provided for my second limit-relay LB, which is used only in the dynamic-braking progression-control. Although this second limit-relay LB is used only during dynamic-braking, and not during the motoring operation, it is nevertheless convenient to energize its rate-coil RC' in the same manner as the other rate-coil RC, these two rate-coils being shown, for convenience, in series with each other, simply by way of an example. Since the second limit-relay LB is not in any of the control-circuits during motoring acceleration, the recalibration of the rate-coil RC' of this second limit-relay, during motoring, under the control of the LS2 interlock 293 and the weight-responsive rheostat 205, is immaterial, and it is simpler to let it happen than to provide means for locking out this rate-coil control of the rate-coil RC' during the motoring operation.

The operation of the simplified illustrated apparatus will be clear from the running comments which have been made during the progress of the description, as well as from the prior art which is represented by the Riley and Purifoy patent and the copending Riley application. A few words of added explanation, as to the features which are more particularly related to my novel relay-circuit parts, may, however, be helpful.

The novel control feature of the present invention is the use of two limit-relays, CR and LB, respectively, one for each of the individual braking-circuits, during the dynamic-braking operation. The invention is applicable, either when there are only two traction-motors on the car, as indicated in Fig. 1, with a single motor in each of the two series-motor means or circuits, or when there are four motors, which is the usual construction, as indicated in Fig. 2, the second motor in each series-motor means or circuit being indicated by primes, as A1', SF1', A2' and SF2'. In any case, each motor-armature is mounted on, or has a drive-connection with, its own drive-shaft 295 and drive-wheel or wheels 296, as indicated in Fig. 2.

In Fig. 2, the two limit-relays CR and LB are shown in their simplest or most elementary form, as being simply undercurrent relays, each having a single current-responsive energizing-coil. It will be understood, of course, that each of these relays may have recalibrating-means, such as are represented by the rate-coils RC and RC' of Fig. 1, and if either relay has a recalibrating rate-coil, the other should preferably be similarly recalibrated, at least during the dynamic-braking operation. The two limit-relays CR and LB should preferably be similarly calibrated, because the minimum current which constitutes the desirable dropout-point is the same for each relay, since the motors and motor circuits are the same.

Aside from these concluding observations, no further explanations are believed to be necessary, since the operation and results of my double-limit braking-progression control have been fully explained as the apparatus-connections were being described.

While I have described my invention, and explained its manner of operation, in connection with a particular simplified illustrative form of embodiment, I wish it to be understood that the efficacy of the invention is not affected by the addition of desired additional features or safeguards, or by the omission of undesired or unnecessary features, or by the substitution of equivalent or alternative forms of various means or elements for performing the essential element-functions which have been described and explained. I desire, therefore, that the appended claims shall be given the broadest construction consistent with their language.

I claim as my invention:

1. A railway-motor control-assembly, including the combination; with two series-motor means, adapted to be connected to a plurality of drive-shafts of a vehicle, each series-motor means including a motor-armature or armatures, and a series field winding or windings connected in series therewith; of: (*a*) a braking-circuit means, providing two dynamic-braking circuits wherein the motor-armature or armatures of each of said series-motor means are loaded by the field winding or windings of the other one of said series-motor means, respectively, both of said dynamic-braking circuits including variable braking-circuit resistance; (*b*) a separate braking-controlling limit-relay means, for individually responding to conditions in the respective dynamic-braking circuits, each of said braking-controlling limit-relay means being energized to be responsive to conditions which accompany a lower-than-desired braking-current in its own dynamic-braking circuit; and (*c*) a progressively operating braking-control means, operative only whenever a low-current condition exists simultaneously in both of said limit-relay means, for progressively controlling the braking-adjustments of both of said dynamic-braking circuits during dynamic-braking conditions, said progressively operating braking-controlling means including a means for progressively reducing the braking-circuit resistance in both of said dynamic-braking circuits.

2. The invention as defined in claim 1, characterized by each of said limit-relay means (*b*) including a variable setting-controlling means, and means for simultaneously controlling the two variable setting-controlling means.

3. A railway-motor control-assembly, including the combination; with two series-motor means, adapted to be connected to a plurality of drive-shafts of a vehicle, each series-motor means including a series-circuit connection including, in order, a motor-armature or armatures, an intermediate connection-point, and a series field winding or windings for supplying the field-excitation for said armature or armatures; of: (*a*) a braking-circuit means, for providing a parallel-motor circuit-connection between the armature-terminal of each of said series-motor means and the field-terminal of the other one of said series-motor means, and for providing a common dynamic-braking circuit-connection between the respective intermediate connection-points of the two series-motor means, whereby to provide two dynamic-braking circuits wherein the motor-armature or armatures of each of said series-motor means are loaded by the field winding or windings of the other one of said series-motor means, respectively, both of said dynamic-braking circuits including variable braking-circuit resistance; (*b*) a separate braking-controlling limit-relay means, associated with the non-common portion of each of said two dynamic-braking circuits, each of said braking-controlling limit-relay means being energized to be responsive to conditions which accompany a lower-than-desired braking-current in its own dynamic-braking circuit; (*c*) a progressively operating braking-controlling means, for progressively controlling the braking-adjustments of both of said dynamic-braking circuits during dynamic-braking conditions, said progressively operating braking-controlling means including a means for progressively reducing the braking-circuit resistance in both of said dynamic-braking circuits; and (*d*) a control means, for so controlling said braking-controlling means as to interrupt the progressive adjustments in both of said dynamic-braking circuits whenever either one of said separate braking-controlling limit-relay means is in its acceptable-braking-current condition.

4. The invention as defined in claim 3, characterized by each of said limit-relay means (*b*) including a variable setting-controlling means, and means for simultaneously controlling the two variable setting-controlling means.

GEORGE R. PURIFOY.

References Cited in the file of this patent

UNITED STATES PATENTS

| Number | Name | Date |
|---|---|---|
| 2,428,574 | Lentz | Oct. 7, 1947 |
| 2,436,341 | Weybrew | Feb. 17, 1948 |
| 2,452,191 | Hines et al. | Oct. 26, 1948 |
| 2,523,143 | Riley et al. | Sept. 19, 1950 |